(12) United States Patent
Raj

(10) Patent No.: US 10,789,146 B2
(45) Date of Patent: Sep. 29, 2020

(54) FORECASTING RESOURCE UTILIZATION

(71) Applicant: HEWLETT PACKARD ENTERPRISE DEVELOPMENT LP, Houston, TX (US)

(72) Inventor: Kumar Raj, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 500 days.

(21) Appl. No.: 15/685,343

(22) Filed: Aug. 24, 2017

(65) Prior Publication Data

US 2018/0060205 A1 Mar. 1, 2018

(30) Foreign Application Priority Data

Aug. 25, 2016 (IN) .............................. 201641028943

(51) Int. Cl.
*G06F 11/34* (2006.01)

(52) U.S. Cl.
CPC ...... *G06F 11/3409* (2013.01); *G06F 11/3447* (2013.01); *G06F 11/3452* (2013.01); *G06F 11/3466* (2013.01); *G06F 2201/81* (2013.01); *G06F 2201/875* (2013.01)

(58) Field of Classification Search
CPC ............ G06F 11/3409; G06F 11/3447; G06F 11/3466; G06F 11/3452; G06F 2201/875; G06F 2201/81
See application file for complete search history.

(56) References Cited

U.S. PATENT DOCUMENTS

| 7,890,473 | B1* | 2/2011 | Wyett | G06F 11/3409 707/687 |
| 8,041,808 | B1* | 10/2011 | Becker | G06F 11/3442 702/179 |
| 8,626,902 | B2* | 1/2014 | Singh | G06F 1/3206 709/224 |
| 9,253,325 | B1* | 2/2016 | Smith | H04M 3/5175 |
| 9,525,599 | B1* | 12/2016 | Wang | C23C 18/1641 |
| 2005/0120111 | A1* | 6/2005 | Bailey | G06F 11/3409 709/224 |
| 2008/0028409 | A1* | 1/2008 | Cherkasova | G06F 9/5061 718/104 |
| 2008/0172671 | A1* | 7/2008 | Bouillet | G06F 11/3476 718/104 |
| 2008/0221941 | A1* | 9/2008 | Cherkasova | G06F 11/3414 718/106 |
| 2008/0271038 | A1* | 10/2008 | Rolia | G06F 9/505 718/105 |

(Continued)

OTHER PUBLICATIONS

Daniel Gmach et al., "Workload Analysis and Demand Prediction of Enterprise Data Center Applications," 2007 IEEE 10th International Symposium on Workload Characterization, pp. 171-180, IEEE.

*Primary Examiner* — Mohammad K Islam
(74) *Attorney, Agent, or Firm* — Hewlett Packard Enterprise Patent Department

(57) ABSTRACT

Example embodiments relate to forecast resource utilization. The example disclosed herein receives the first actual resource utilization, detects its pattern and trend, and determines the first forecasted resource utilization. Furthermore, a second actual resource utilization is received and its pattern is detected. Moreover, it is determined whether to forecast a new resource utilization.

20 Claims, 6 Drawing Sheets

(56) References Cited

U.S. PATENT DOCUMENTS

| | | | | |
|---|---|---|---|---|
| 2009/0300173 | A1* | 12/2009 | Bakman | H04L 41/147 709/224 |
| 2011/0270795 | A1* | 11/2011 | Smith | G06F 9/5011 706/52 |
| 2011/0302578 | A1* | 12/2011 | Isci | G06F 9/5077 718/1 |
| 2016/0217384 | A1* | 7/2016 | Leonard | G06N 5/02 |
| 2017/0249564 | A1* | 8/2017 | Garvey | G06F 17/18 |
| 2018/0314616 | A1* | 11/2018 | Savolainen | G06F 9/5083 |
| 2018/0322400 | A1* | 11/2018 | Shahand | G06F 11/3447 |
| 2019/0286485 | A1* | 9/2019 | Carteri | G06F 16/9535 |
| 2019/0373007 | A1* | 12/2019 | Salunke | H04L 41/0654 |

* cited by examiner

FORECASTING RESOURCE UTILIZATION

BACKGROUND

Enterprises may assign datacenter resources to satisfy resource demands. Capacity planning may involve anticipating in advance the future changes in demands. The more accurate the future resource utilization forecast, the more optimally these resources can be allocated in a cost-effective way.

BRIEF DESCRIPTION OF THE DRAWINGS

Features of the present disclosure are illustrated by way of example(s) and not limited in the following figure(s) in which like numerals indicate like elements, in which.

DETAILED DESCRIPTION

Figure 1:
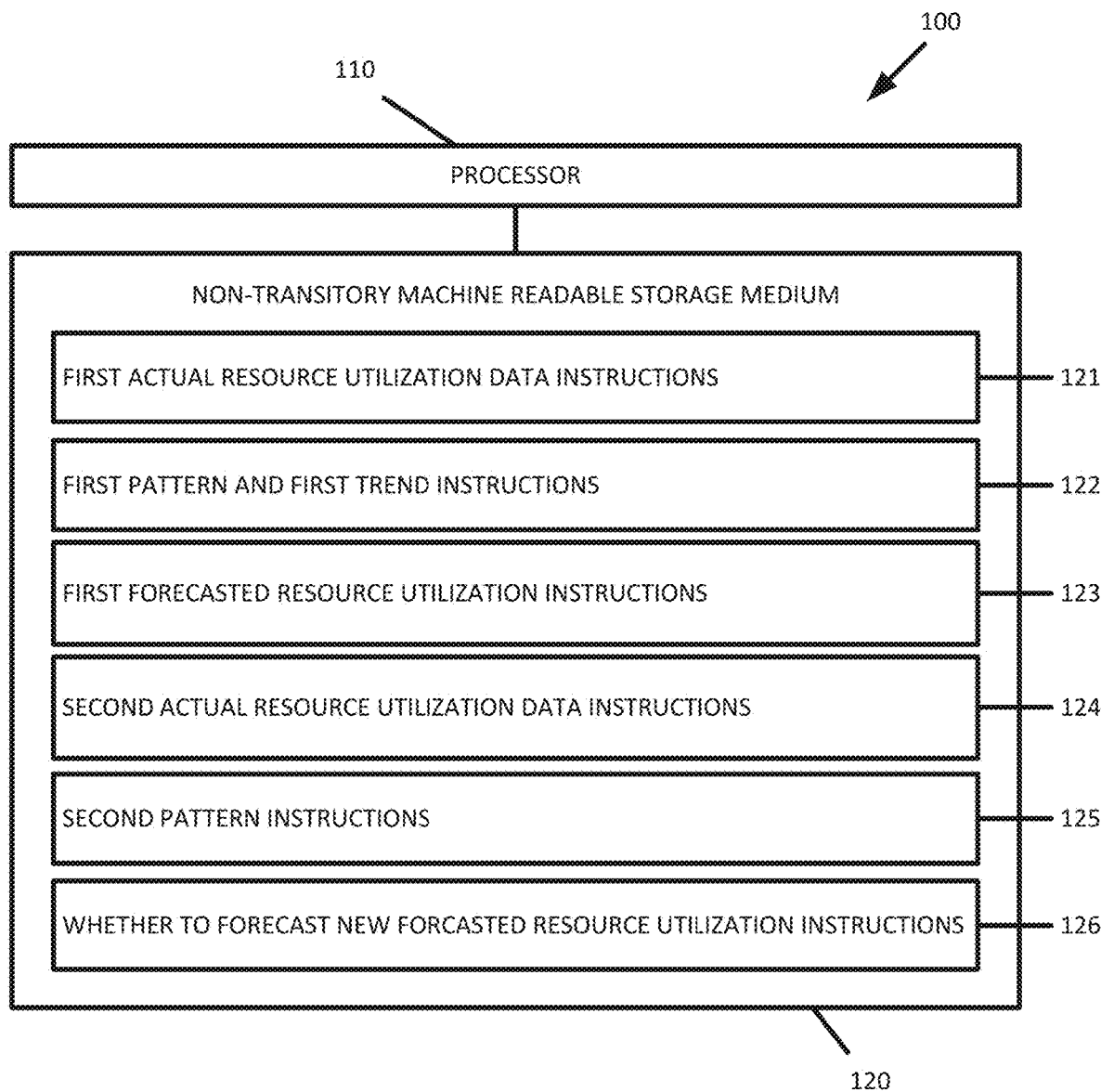
FIG. 1 is a block diagram illustrating a system for forecasting resource utilization, according to an example of the present disclosure.

The following discussion is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

In some examples of Information Technology (IT) usage in corporate enterprises, data centers may include small numbers of large mainframe computers that each host several application workloads with many users connected to them through terminals. Data center administrators may ensure that sufficient capacity is available to run the enterprise applications accessible by the users of the enterprise.

With advances in computer hardware and software, and enterprises moving away from centralized mainframes to distributed computing, new application workloads may be assigned to their own smaller servers. The incremental cost of adding new smaller servers may be smaller than that of mainframes. In distributed computing, IT administrators may anticipate an application's workload demands two years in advance and pre-provision a new server with sufficient capacity so that the workload could grow into it.

However, the recent explosive growth in both enterprise computing and Internet computing and the dynamic nature of workloads has led to difficulties in capacity planning years in advance. Today's enterprise data centers may be full of large numbers of lightly utilized servers that incur high cost of ownership including facilities cost, such as rent and power for computing and cooling, high software licensing cost, and high cost for human management activities.

Therefore, when capacity planning, many enterprises may exploit resource pools of servers supported by virtualization mechanisms that enable multiple application workloads to be hosted on each server.

The resource demands on today's enterprise data center resources may change dynamically, and capacity planning may need to anticipate in advance the future changes in demands. In order to be cost effective in managing the resources, the IT administrators may pre-order more virtual resources, such as by placing virtual machines (VMs), for time durations when greater demands are anticipated and free up those resources during times of low demands.

Accordingly, the present disclosure provides examples in which data center resource utilization may be forecasted for longer future durations with high accuracy based on a minimal amount of historical data to help the IT administrators in better capacity planning. These examples may also incorporate continuous monitoring of the quality of the forecasting model and may involve retraining the model for better accuracy.

The examples of the present disclosure may improve the accuracy of forecasting through the detection of pattern changes in the historical data, and by considering a most recent pattern in the data for forecasting. These examples may also include a continuous feedback loop to check for errors and to retrain the forecasting model when needed.

In examples of the present disclosure, the system may have access to a raw data pool. The "raw data pool" is understood herein as any suitable data repository. For example, a raw data pool may be in the form of a suitable relational database, hierarchical database, network database, object database, or any other suitable form of database that contains historical data related to the variable of study, for example Central Processing Unit (CPU) resource utilization.

Referring now to the drawings, FIG. 1 is a block diagram illustrating a system 100 for forecasting resource utilization, according to an example of the present disclosure. The system 100 includes a physical processor 110 and a non-transitory machine readable storage medium 120. The non-transitory machine readable storage medium 120 comprises first actual resource utilization data instructions 121; first pattern and first trend instructions 122; first forecasted resource utilization instructions 123; second actual resource utilization data instructions 124; second pattern instructions 125; whether to forecast new forecasted resource utilization instructions 126; and/or other instructions for forecasting resource utilization.

In an example, the instructions 121-126, and/or other instructions can be part of an installation package that can be executed by processor 110 to implement the functionality described herein. In such a case, non-transitory machine readable storage medium 120 may be a portable medium such as a CD, DVD, or flash device or a memory maintained by a computing device from which the installation package can be downloaded and installed. In another example, the program instructions may be part of an application or applications already installed in the computer readable medium 100.

The non-transitory machine readable storage medium 120 may be any electronic, magnetic, optical, or other physical storage device that contains or stores executable data accessible to the computer readable medium 100. Thus, non-transitory machine readable storage medium 120 may be, for example, a Random Access Memory (RAM), an Electrically Erasable Programmable Read-Only Memory (EEPROM), a storage device, an optical disc, and the like. The non-transitory machine readable storage medium 120 does not encompass transitory propagating signals. Non-transitory machine readable storage medium 120 may be allocated in the system 100 and/or in any other device in communication with the system 100. As described in detail below, the non-transitory machine-readable storage medium 120 may be encoded with first actual resource utilization data instructions 121, first pattern and first trend instructions 122, first forecasted resource utilization instructions 123, second actual resource utilization data instructions 124, second pattern instructions 125, and whether to forecast new forecasted resource utilization instructions 126

The instructions 121-126 may be machine readable instructions stored in the non-transitory machine readable storage medium 120 that are executable by the processor 110 to perform the instructions 121-126.

In the example of FIG. 1, the first actual resource utilization data instructions 121, stored on the non-transitory machine readable storage medium 120, when executed by the processor 110, cause the processor 110 to receive the first actual resource utilization data during the first time period.

Any time period may be defined, however for illustrative purposes a baseline benchmark period of 1 day will be described. Therefore, the first time period may stand for the first day, the second time period for the second day, and so forth.

First actual resource utilization data instructions 121 may cause the processor 110 to gather and process the appropriate raw database data into the system 100.

The first pattern and first trend instructions 122, stored in the non-transitory machine readable storage medium 120, when executed by the processor 110, cause the processor 110 to detect a first pattern in the first data and a first trend in the first data based on the first pattern.

The first pattern and first trend instructions 122 may cause the processor 110 to first detect the pattern of the first period inputted data sets. The first period inputted data sets can include any amount of data sets. If more datasets used, projections using the data sets may be more accurate, albeit with greater computation overhead. Continuing with the daily baseline example, the minimum amount of datasets may be 24 data points (at a processing speed rate of 1 data point per hour) and the maximum may be defined by the system, for example 90 days and therefore 2160 data points.

The first pattern and first trend instructions 122 may perform a pattern and trend analysis, e.g. a trend threshold level of fit to decide whether the detected trend is acceptable to perform the regular forecast or not.

The first forecasted resource utilization instructions 123, stored in the non-transitory machine readable storage medium 120, when executed by the processor 110, cause the processor 110 to determine, based on the first trend, a first forecasted resource utilization by the computing device during the second time period.

The first forecasted resource utilization instructions 123 may cause the processor 110 to forecast using different methods depending on whether the trend and pattern was found in the time series or not.

The second actual resource utilization data instructions 124, stored in the non-transitory machine readable storage medium 120, when executed by the processor 110, cause the processor 120 to receive second data representing a second actual resource utilization by the computing device during the second time period and compare the actual data with the forecasted data in order to perform a forecasting model validation.

The second pattern instructions 125, stored in the non-transitory machine readable storage medium 120, when executed by the processor 110, cause the processor 110 to detect the second pattern in the second data.

The second pattern instructions 125 may cause the processor 110 to, each day, receive the previous day actual data and compare it with the forecasted data for that previous day to detect whether pattern may have changed or not.

The whether to forecast new forecasted resource utilization instructions 126, stored in the non-transitory machine readable storage medium 120, when executed by the processor 110, cause the processor 110 to determine, based on whether the second pattern is different from the first pattern, whether to determine a new forecasted resource utilization by the computer device.

The whether to forecast new forecasted resource utilization instructions 126 may cause the processor 110 to detect when a new forecasting model may be needed.

Figure 2A:
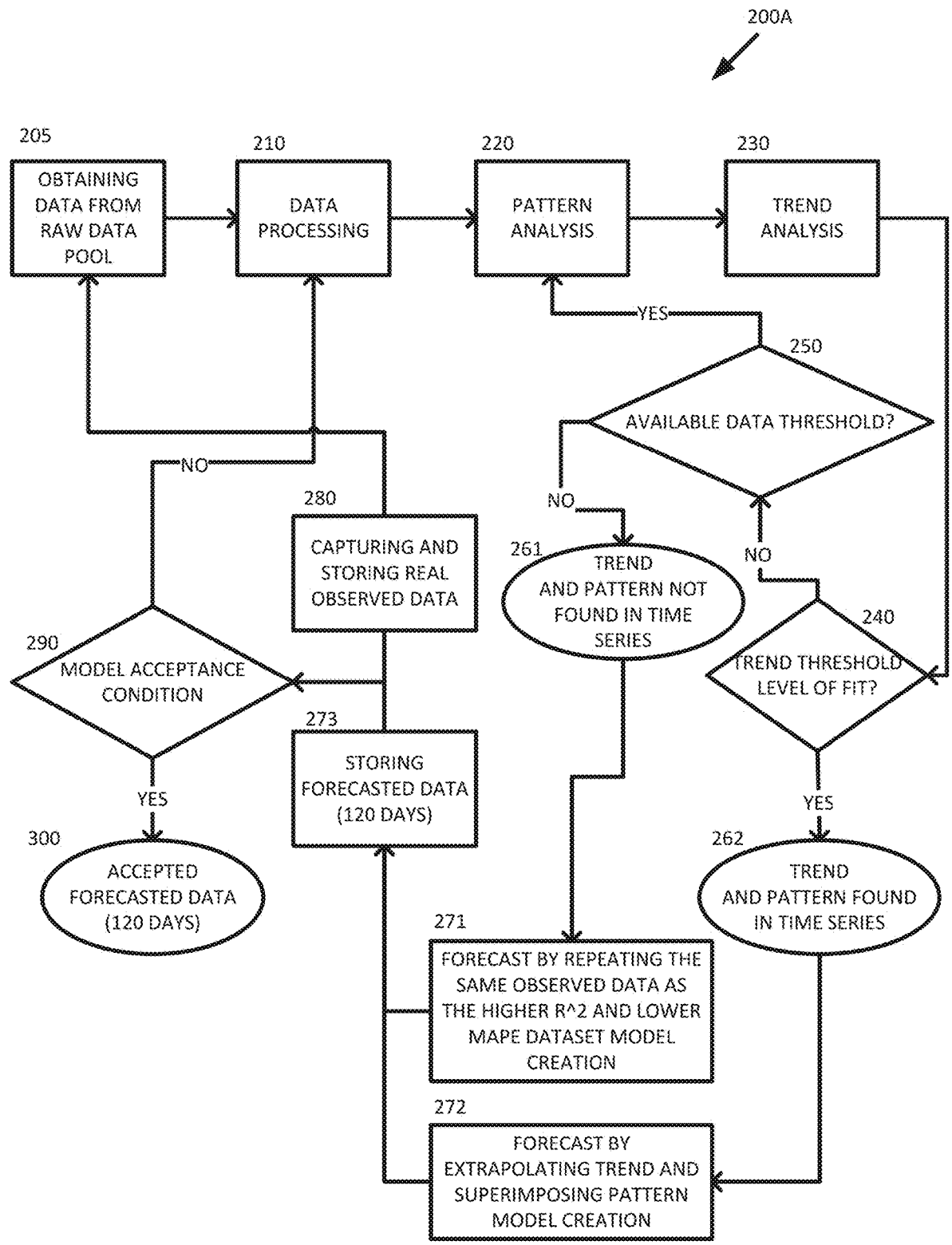
FIG. 2A is a flowchart for a method for forecasting resource utilization up to the first model validation, according to an example of the present disclosure.
Figure 2B:
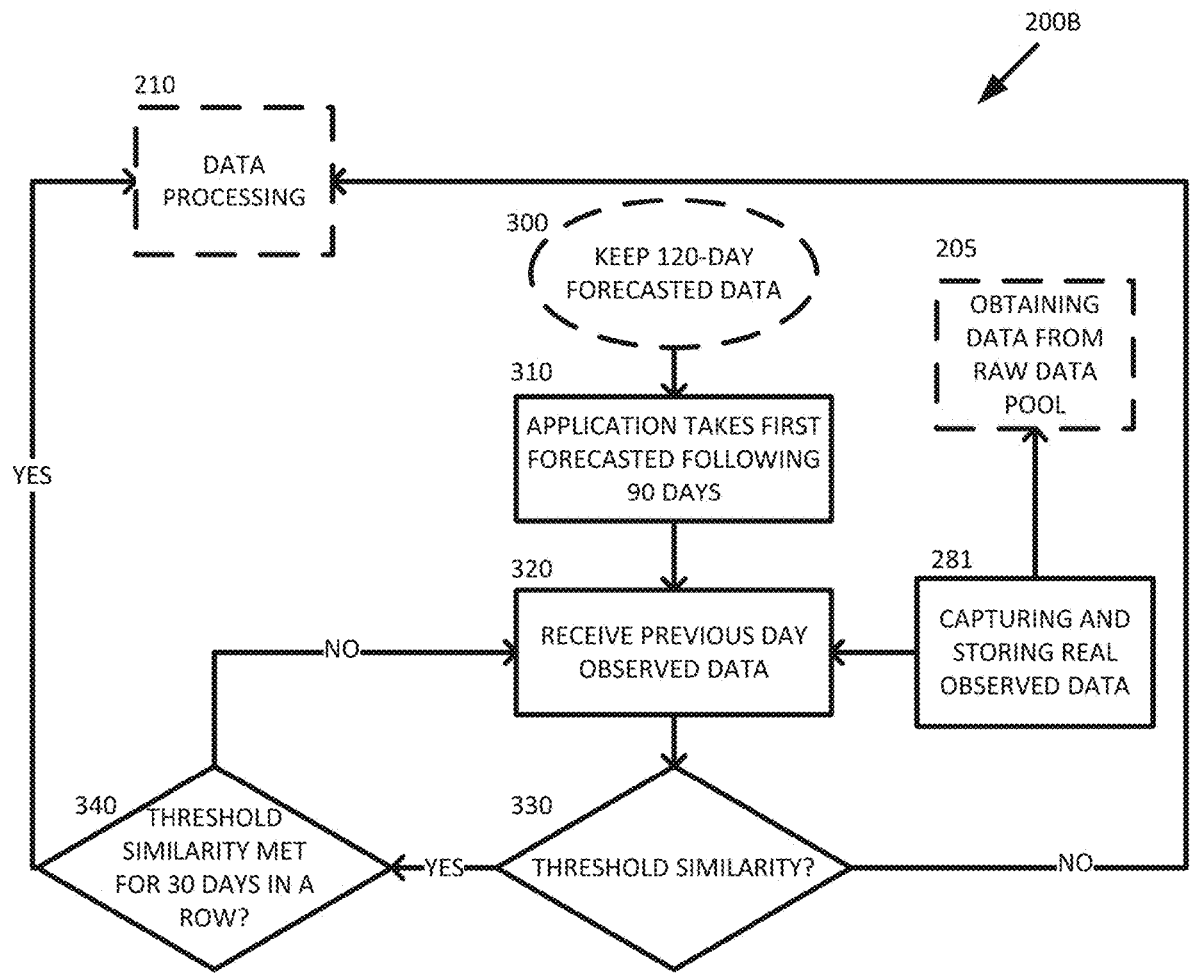
FIG. 2B is a flowchart for a method for forecasting resource utilization from the first model validation, according to an example of the present disclosure.

FIG. 2A and FIG. 2B describe an example disclosed within FIG. 1 for clarity purposes.

FIG. 2A is a flowchart for a method 200A for forecasting resource utilization up to the first model validation, according to an example of the present disclosure.

While the present disclosure can forecast data from any target variable, for clarity and merely by way of example without restricting the scope of the present disclosure FIG. 1, FIG. 2A, FIG. 3, FIG. 4, and FIG. 5; show an example of forecasting CPU resource utilization.

Both the time units and time values used in the present disclosure are examples and, therefore, are not fixed values. Furthermore, the present document discloses threshold criteria as examples, and therefore the threshold criteria can be assessed with other criteria beyond those disclosed hereinafter. As all the examples disclosed herein, this example should not be interpreted, or otherwise used, as limiting the scope of the disclosure, including the claims.

FIG. 2A describes an obtaining data from raw data pool block 205; a data processing block 210; a pattern analysis block 220; a trend analysis block 230; a trend threshold level of fit block 240; an available data threshold block 250; a trend and pattern not found in time series state 261; a trend and pattern found in the time series state 262; a forecast by repeating the same observed data as the higher $R^2$ and lower MAPE dataset block 271; a forecast by extrapolating tend and superimposing pattern 272; a storing forecasted data block 273; a capturing and storing real observed data 280; a model acceptance condition block 290; and an accepted forecasted data block state 300.

The raw data pool, which may be stored in the medium 120, may be updated every 5 minutes with one CPU resource utilization data point. Therefore, every hour, the raw data pool may be updated with 12 new data points from the previous hour that could be obtained by block 205.

In the present disclosure, "data point" may be understood as a set of one measurement or multiple measurements of the target variable at a specific time, for example, the CPU resource utilization at 12:00 am of the system.

Even though the raw data pool may have a huge amount of CPU utilization data, the present disclosure may not process all of that data. The more data the system 100 processes, the more computing time it would take to forecast and the more computing resources it would need. Therefore, a processing speed rate may be defined.

The "processing speed rate" may be defined as the amount of data points that are inputted to the system per time period, for example 1 data point per hour.

In some examples, the data points may be processed in various ways. The processing criteria may also be, for example, an hourly data processing. In some examples, the processing may be performed at predetermined times at a predetermined frequency, for example once per hour. In some examples, the processing may include determining an arithmetic average of the 12 data points over a time period, or a weighted average of the 12 data points over a time period using predetermined weights. In some examples, the processing may include removing outlier data points that are above a 95% percentile of values and below a 5% percentile of values (e.g. removing the 5% highest valued data points and the 5% lowest valued data points). In examples in which there may be missing data point values corresponding to particular time values, these missing values may be added to the raw data pool using linear interpolation of the adjacent data point values. In some examples, the processed data values may be used in subsequent operations, for example the averaged data points may be used.

The system 100 may perform a pattern analysis block 220 in which all dominant patterns in the same time series, and the frequencies of those patterns, are identified using periodogram construction and finding local maximums.

This may be performed by checking every data point in the periodogram spectral density output of the data points to determine whether the data point is greater than the two data points of its vicinity.

The periodogram calculates the significance of different frequencies in time-series data to identify any intrinsic periodic signals and it is a helpful tool for identifying the dominant cyclical behavior in a series, particularly when the cycles are not related patterns associated with monthly or quarterly seasonality. In short, the periodogram gives information about the relative strengths of the various frequencies for explaining the variation in the time series.

The spectral density is a frequency domain characterization of a population stationary time series and therefore, is a frequency domain representation of a time series that is directly related to any measure of how two random variables change together, for example the autocovariance time domain representation. In essence, the spectral density and the autocovariance function contain the same information, but express it in different ways. The autocovariance and spectral density are Fourier transform pairs.

In the present example, autocovariance is calculated from the processed datasets and the Fourier transformation is applied afterwards obtaining its spectral density output. Then the spectral density output is plotted as the periodogram.

Figure 3A:
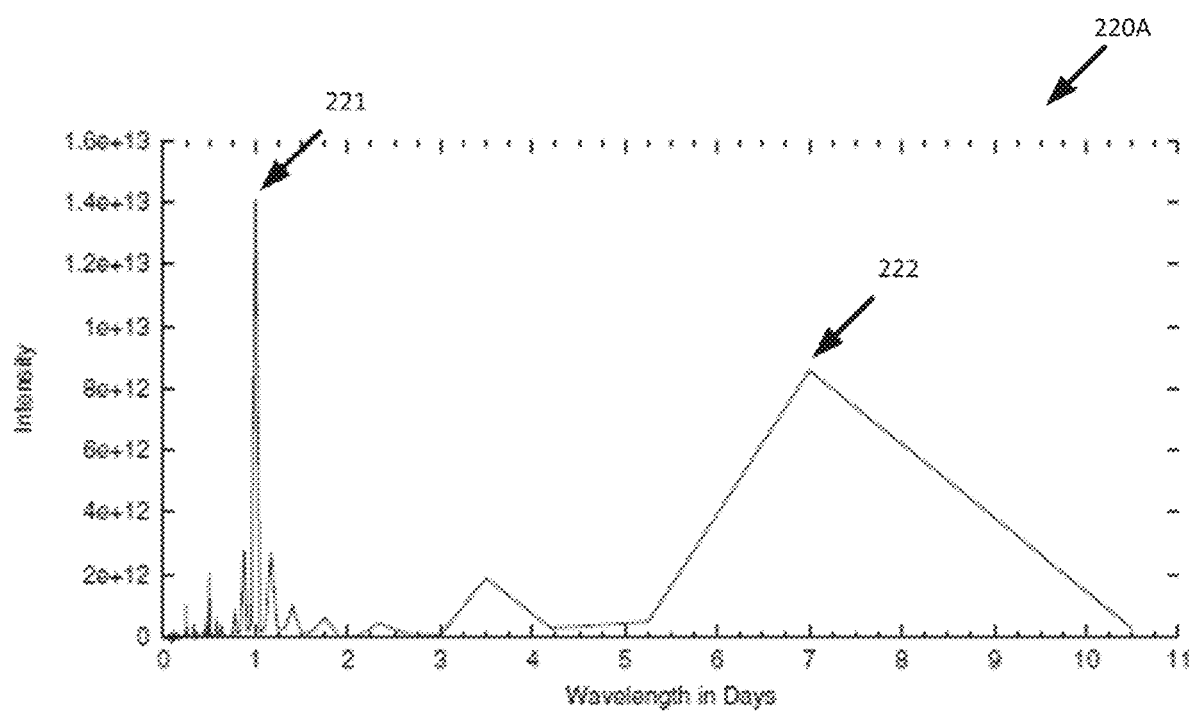
FIG. 3A is a periodogram to determine the most probable frequencies in the pattern analysis according to an example of the present disclosure.

FIG. 3A is a periodogram 220A to determine the most probable frequencies in the pattern analysis according to an example of the present disclosure. The periodogram 220A shows a plurality of spikes distributed across the time series. These spikes indicate the most probable frequency which is present in the time series. Then, in order to check where the local maximums, and therefore where the most probable frequencies are, each point is compared to the two points of its vicinity and it is concluded that the most probable frequencies are found in day 1 (221) and day 7 (222).

The processor 110 may detect the most dominant pattern time period for example using an auto correlation in the time series with equal lag to the time periods identified during the periodogram construction phase.

An autocorrelation plot indicates where in the time series is found the most dominant frequency or pattern. The autocorrelation is plotted for all the lags, and the system 100 checks whether the value of the autocorrelation of the lags equals the probable time period determined using the periodogram 220A. Whichever time period gives highest autocorrelation period belongs to the most dominant pattern.

Figure 3B:
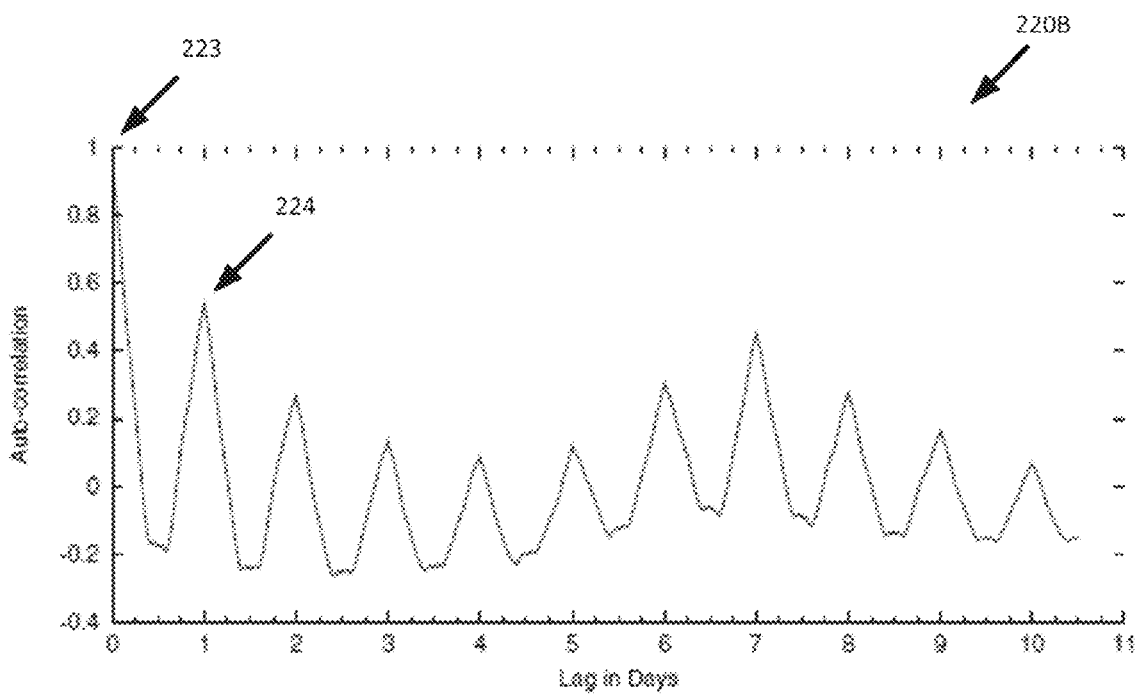
FIG. 3B is an autocorrelation plot to determine the most dominant pattern in the pattern analysis according to an example of the present disclosure.

FIG. 3B is an autocorrelation plot 220B to determine the most dominant pattern in the pattern analysis according to an example of the present disclosure.

In FIG. 3B, taking into account that day 0 has no lag, and therefore an autocorrelation value of 1 (223), the day 0 autocorrelation value is not taken into account in the analysis. It is concluded from the spikes of the autocorrelation plot 220B that the most dominant pattern is in day 1 (224) as it is the highest autocorrelation spike.

Returning to FIG. 2A, the system 100 may also perform a trend analysis block 230, in which after the most dominant pattern in the time series is detected, that most dominant pattern is removed, for example using seasonality indexes to the entire processed data. Furthermore, trend from the processed data is detected using, for example, linear curve fitting.

The processor 110 may check whether the obtained trend is precise enough to be used for forecasting future period CPU resource usage, for example using a trend threshold level of fit block 240. Some examples may be using Mean Absolute Percentage Error (MAPE), Root Mean Square Error (RMSE), or Coefficient of Determination ($R^2$) setting a threshold level of fit for each one, for example the industrially accepted levels MAPE<10%, and $R^2$>0.6 respectively.

At decision block 240, it may be determined whether the detected trend matches the trend threshold level of fit. If the detected trend matches the trend threshold level of fit, then it may mean that a trend and pattern have been found in time series, as shown at block 262.

If the detected trend does not match the trend threshold level of fit 240, then at available data threshold decision block 250, the processor 110 may determine whether the data processing block 210 has processed enough data to perform another pattern analysis block 220 and trend analysis block 230. The processor 110 may determine whether the further processed available amount of data is higher than the data required threshold for forecasting.

The data required threshold for forecasting may be understood for example, as the minimum amount of data that may be used to forecast CPU resource utilization and therefore to create a new CPU resource utilization forecasting model.

If the data available amount is higher than the data required threshold for forecasting, the system 100 may perform again the pattern analysis block 220 and the trend analysis block 230 as described above in order to detect a more accurate trend.

If the data available amount is not higher than the data required threshold for forecasting may mean that trend and pattern were not found in the time series, as shown at block 261.

If the trend and pattern have not been found in the time series at block 261, this may mean that the system 100 did not find a valid trend and therefore cannot forecast using a trend determined by the trend analysis block 230. Hence, the processor 130 may create a forecast model at block 271 for example by using the same values as the past data for the time period in which the past data best met the threshold similarity of decision block 240.

If the trend and pattern have been found in the time series at block 262, then it may mean that the system 100 found a valid trend and therefore, this trend may be used to build the forecasting model. Hence, the processor 130 may create a forecast model at block 272 for example by extrapolating trend and superimposing the detected pattern by applying the previously used seasonality indexes.

In the current example, the system 100, either forecasting by repeating the same observed data forecasting model block 271 or forecasting by extrapolating trend and superimposing pattern forecasting model block 272, may forecast the CPU resource usage for the following 120 days and may store them to the stored forecasted data at block 273.

The system 100 receives the actual data from the second period and stores in the capturing and storing real data observed data at block 280. These data may be compared with the storing forecast data at block 273 in order to check whether the forecasting models at blocks 271/272 are valid by performing the model acceptance condition decision block 290.

These real observed data from the capturing and storing real observed data block 280 may be further stored in the data pool from the obtaining data from raw data pool block 205.

The processor 110 may perform the model acceptance condition decision block 290 for example by calculating the MAPE from the actual data block 280 and the according forecasted data block 273; and checking whether the previous MAPE calculation is not greater than the model validation MAPE threshold, for example 20%.

If the model acceptance condition decision block 290 is not met, this may mean that the 120-day forecasted data and the forecasting model are not valid and therefore the system may need to calculate a more accurate CPU resource usage forecasting model using the most recent processed data block 210.

If the model acceptance condition decision block 290 is met, this may mean that the 120-day forecasted data is valid and therefore accepted.

In the example of FIG. 2B, the application may take for example the forecasted data from the following 90 days as shown in the application takes first forecasted following 90 days.

FIG. 2B is a flowchart for a method 200B for forecasting resource utilization from the first model validation, according to an example of the present disclosure.

FIG. 2B describes the accepted forecasted data block state 300 from FIG. 2A; an application takes first forecasted following 90 days block 310; a capturing and storing real observed data 281; the obtaining data from raw data pool block 205 from FIG. 2A; a receive previous day observed data 320; a threshold similarity block 330; a threshold similarity met for 30 days in a row block 340; and data processing block 210 from FIG. 2A.

For example in FIG. 2B, system 100 may, each day, receive the actual data from the previous day via the receive previous day observed data block 320 from the capturing and storing real observed data block 281.

These actual observed data from the capturing and storing actual observed data block 280 may be further stored in the data pool from the obtaining data from raw data pool block 205.

Once new data is available, the processor 110 may perform the threshold similarity condition decision block 330 which may involve, for example: calculating the MAPE from the actual data block 320 and the according forecasted data block 273; and checking whether the previous MAPE calculation is not greater than the model validation MAPE threshold, for example 20%.

If the threshold similarity condition at decision block 330 from the previous day actual observed data and its associated forecasted data for the same previous day, is not met, then the system 100 may need a more precise CPU resource utilization forecasting model with the most recent processed data at block 210.

If the threshold similarity condition at decision block 330 from the previous day observed data and the according forecasting data, is met, then the processor 110 may check whether the threshold similarity condition has been met for a large number of days in a row at block 340 (e.g. 30 days).

Continuing with the example, if the threshold similarity condition is met and it has been met for 30 days in a row at decision block 340, it may be considered that the forecasted data is obsolete and the system 100 may need a more accurate CPU resource utilization forecasting model with the most recent processed data at block 210.

If the threshold similarity condition is not met for 30 days in a row at decision block 340, it is considered that the forecasted data is still valid and the system 100 may wait for the following day to receive the present day actual data.

The above described programmed hardware referred as a system 100 for forecasting resource utilization may implement the system engines as disclosed in the following example.

Figure 4:
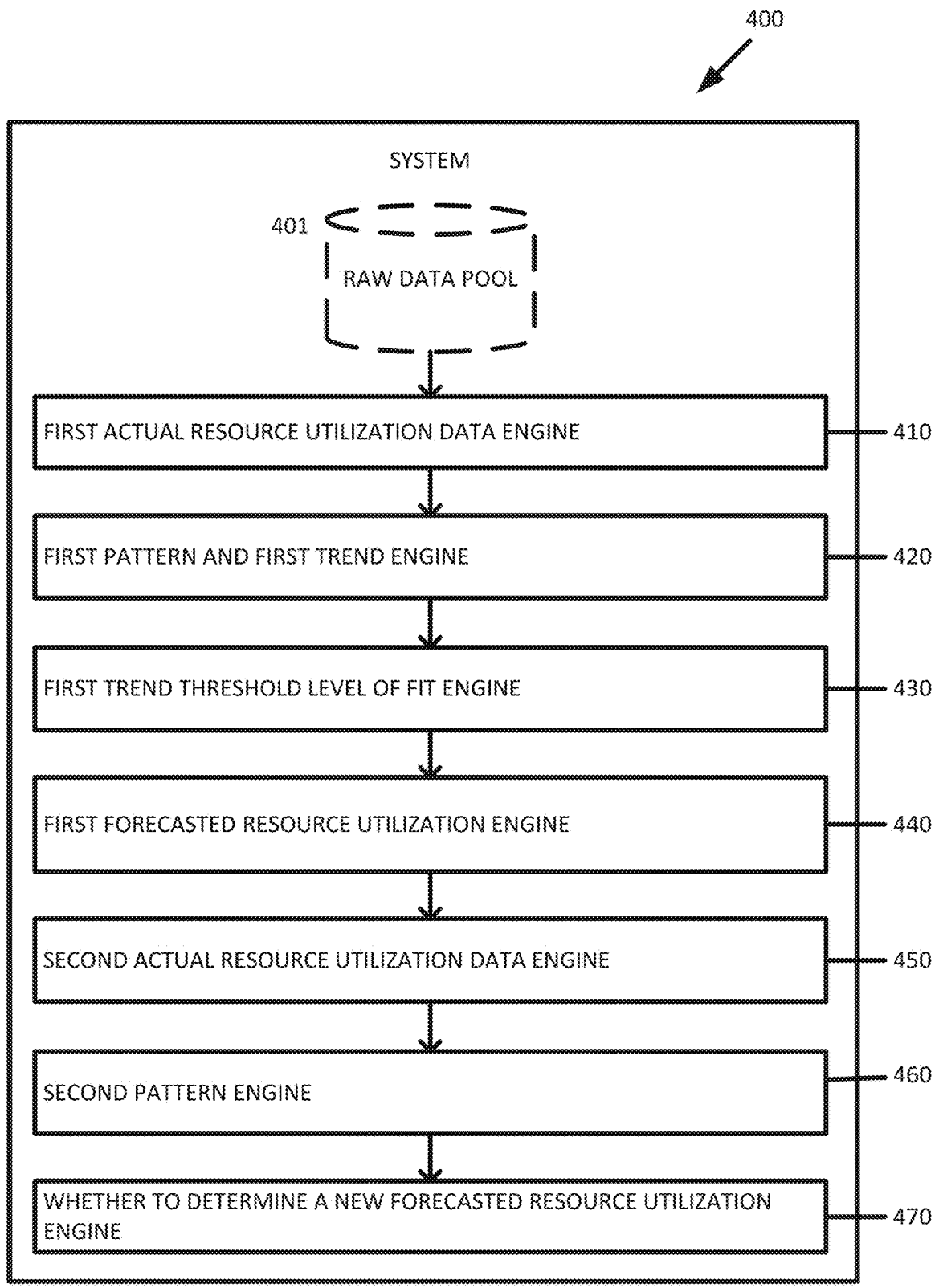
FIG. 4 is a block diagram illustrating a system for forecasting resource utilization, according to an example of the present disclosure.

FIG. 4 is a block diagram illustrating a system 400 for forecasting resource utilization, according to an example of the present disclosure.

The system 400 of the disclosed example comprises a set of engines. Each of the engines may be implemented by computing hardware, or a combination of computing hardware and programming. In some examples, the system 400 may implement the functionality described in FIG. 1.

The system 400 comprises: a first actual resource utilization data engine 410, a first pattern and first trend engine 420, a first trend threshold level of fit engine 430, a first forecasted resource utilization engine 440, a second actual resource utilization data engine 450, a second pattern engine 460, and a whether to determine new forecasted resource utilization engine 470. The system 400 may have access to a raw data pool 401.

The first actual resource utilization data engine 410 executes the instructions to receive and process the first actual resource utilization data from the accessed raw data pool 401 during the first time period. The first actual resource utilization data engine 410 may perform this functionality in a manner similar to or the same as the first actual resource utilization data instructions 121 as described above in respect to FIG. 1.

The first pattern and first trend engine 420 executes the instructions to detect a first pattern in the first data and a first trend in the first data based on the first pattern. The first pattern and first trend engine 420 may perform this functionality in a manner similar to or the same as the first pattern and first trend instructions 122 as described above in respect to FIG. 1.

The first trend threshold level of fit engine 430 executes the instructions to assess whether the detected trend validly represents the processed dataset. The first trend threshold level of fit engine 430 may perform this functionality in a manner similar to or the same as first pattern and first trend instructions 122 as described above in respect to FIG. 1.

The first forecasted resource utilization engine 440 executes the instructions to forecast using different methods depending on whether the trend and pattern was found in the time series or not. The first forecasted resource utilization engine 440 may perform this functionality in a manner similar to or the same as the first forecasted resource utilization instructions 123 as described above in respect to FIG. 1.

The second actual resource utilization data engine 450 executes the instructions to receive the second period actual data and compare the actual data with the forecasted data in order to perform a forecasting model validation. The second actual resource utilization data engine 450 may perform this functionality in a manner similar to or the same as the second actual resource utilization data instructions 124 as described above in respect to FIG. 1.

The second pattern engine 460 executes the instructions to daily receive the previous day actual data and compare it with the according forecasted data to detect whether pattern may have changed or not. The second pattern engine 460 may perform this functionality in a manner similar to or the same as the second pattern instructions 125 as described above in respect to FIG. 1.

The whether to determine a new forecasted resource utilization engine 470 executes the instructions to detect when a new forecasting model may be needed. The whether to determine a new forecasted resource utilization engine 470 may perform this functionality in a manner similar to or the same as the whether to determine a new forecasted resource utilization instructions 126 as described above in respect to FIG. 1.

The above described system for forecasting resource utilization may implement the method disclosed in the following example.

Figure 5:
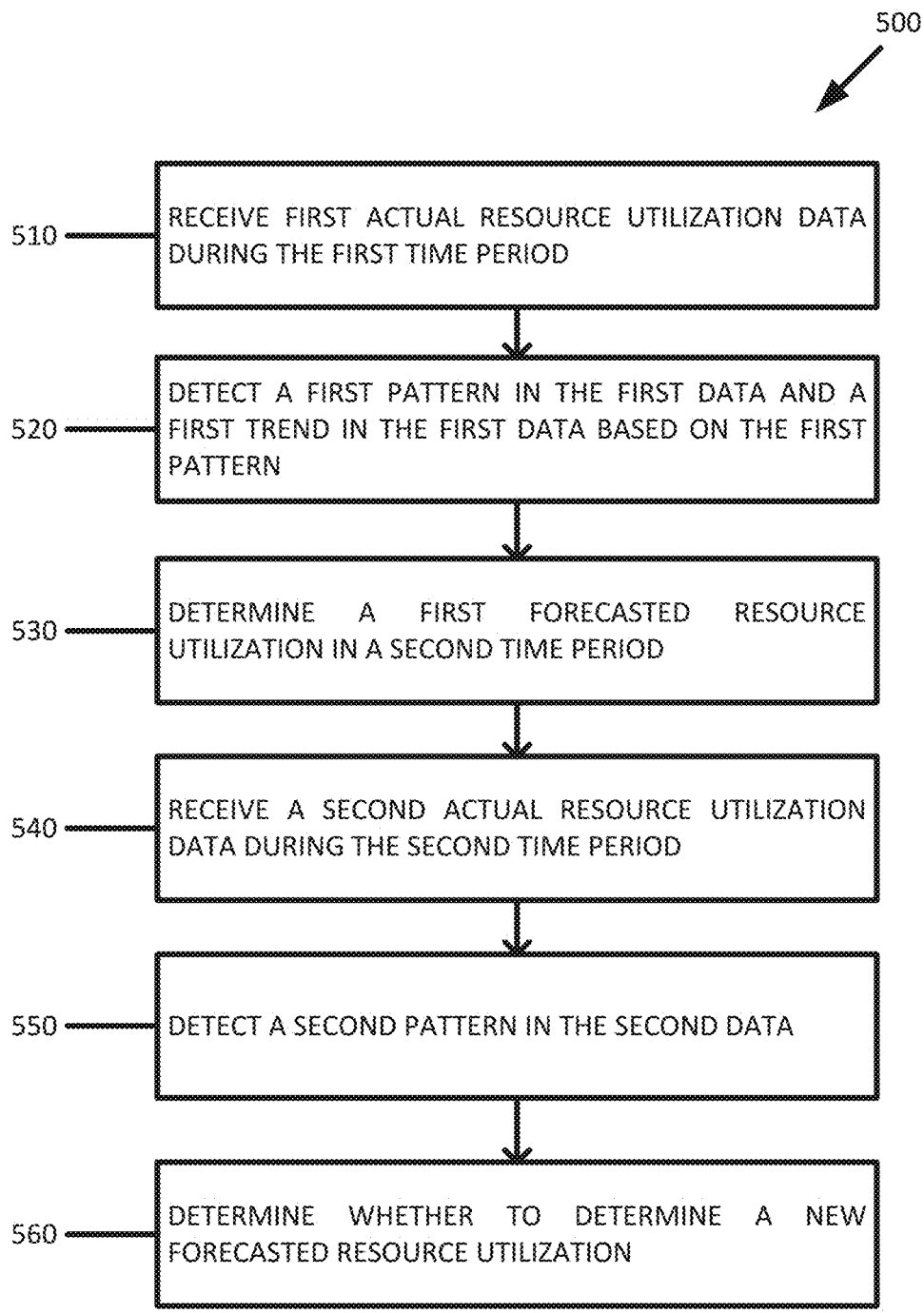
FIG. 5 is a flowchart illustrating a method for forecasting resource utilization, according to an example of the present disclosure.

FIG. 5 is a flowchart illustrating a method 500 for forecasting resource utilization, according to an example of the present disclosure. As shown in FIG. 5, the method includes the following operations. Method 500 as well as the methods described herein can, for example, be implemented in the form of machine readable instructions stored on memory of a computing system (see, e.g., the implementation of FIG. 4), executable instructions stored on a non-transitory machine readable storage medium (see, e.g., the implementation of FIG. 1), in the form of electronic circuitry, or another suitable form.

At block 510, the method 500 receives first actual resource utilization data during the first time period. For example system 100 (and/or first actual resource utilization data instructions 121, first actual resource utilization data engine 410, and/or any other resource of system 100) may receive first actual resource utilization data during the first time period. The system 100 may receive first actual resource utilization data during the first time period in a manner similar or the same as that described above in relation to the execution of obtaining data from raw data pool 205, data processing 210, and/or another resource of system 100.

At block 520, the method 500 detects a first pattern in the first data and a first trend in the first data based on the first pattern. For example system 100 (and/or first pattern and first trend instructions 122, first pattern and first trend engine 420, first trend threshold level of fit engine 430, and/or any other resource of system 100) may detect a first pattern in the first data and a first trend in the first data based on the first pattern. The system 100 may detect a first pattern in the first data and a first trend in the first data based on the first pattern in a manner similar or the same as that described above in relation to the execution of pattern analysis 220, trend analysis 230, trend threshold level of fit 240, available data threshold 250, trend and pattern not found in time series 261, trend and pattern found in time series 262, and/or another resource of system 100.

At block 530, the method 500 determines a first forecasted resource utilization in a second time period. For example system 100 (and/or first forecasted resource utilization instructions 123, first forecasted resource utilization engine 440, and/or any other resource of system 100) may determine a first forecasted resource utilization in a second time period. The system 100 may detect a first forecasted resource utilization in a second time period in a manner similar or the same as that described above in relation to the execution of forecast by repeating the same observed data as the higher $R^2$ and lower MAPE dataset model creation 271, forecast by extrapolating trend and superimposing pattern model creation 272, storing forecasted data (120 days) 273, and/or another resource of system 100.

At block 540, the method 500 receives a second actual resource utilization data during the second time period. For example system 100 (and/or second actual resource utilization data instructions 124, second actual resource utilization data engine 450, and/or any other resource of system 100) may receive a second actual resource utilization data during the second time period. The system 100 may receive a second actual resource utilization data during the second time period in a manner similar or the same as that described above in relation to the execution of capturing and storing real observed data 280, model acceptance condition 290, accepted forecasted data (120 days) 300, application takes first forecasted following 90 days 310, and/or another resource of system 100.

At block 550, the method 500 detects a second pattern in the second data. For example system 100 (and/or second pattern instructions 125, second actual pattern engine 460, and/or any other resource of system 100) may detect a second pattern in the second data. The system 100 may detect a second pattern in the second data in a manner similar or the same as that described above in relation to the execution of obtaining data from raw data pool 205, capturing and storing real observed data 281, receive previous day observed data 320, threshold similarity 330, and/or another resource of system 100.

At block 560, determines whether to determine a new forecasted resource utilization. For example system 100 (and/or whether to forecast new forecasted resource utilization instructions 126, whether to determine a new forecasted resource utilization engine 470, and/or any other resource of system 100) may determine whether to determine a new forecasted resource utilization. The system 100 may determine whether to determine a new forecasted resource utilization in a manner similar or the same as that described above in relation to the execution of threshold similarity met for 30 days in a row 340, data processing 210, and/or another resource of system 100.

The above examples may be implemented by hardware, firmware, or a combination thereof. For example the various methods, processes and functional modules described herein may be implemented by a physical processor (the term processor is to be interpreted broadly to include CPU, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, methods and functional modules are implemented as machine readable instructions executable by at least one processor, hardware logic circuitry of the at least one processors, or a combination thereof.

The drawings in the examples of the present disclosure are some examples. It should be noted that some units and functions of the procedure are not necessarily essential for implementing the present disclosure. The units may be combined into one unit or further divided into multiple sub-units.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A method implemented by a computer system comprising a physical processor implementing machine readable instructions, the method comprising:
   receiving first data representing a first actual resource utilization by a computing device during a first time period;
   detecting a first pattern in the first data and a first trend in the first data based on the first pattern;
   determining, based on the first trend, a first forecasted resource utilization by the computing device in a second time period after the first time period;
   receiving second data representing a second actual resource utilization by the computing device during the second time period;
   detecting a second pattern in the second data; and
   determining, based on whether the second pattern is different from the first pattern, whether to determine a new forecasted resource utilization by the computing device.

2. The method of claim 1, further comprising determining whether the first trend has a threshold level of fit with the first data.

3. The method of claim 2, further comprising, in response to the first trend not having the threshold level of fit:
   detecting a third pattern in the first data and third data and a third trend in the first data and the third data based on the third pattern, wherein the third data represents a third actual resource utilization by the computing device in a different period of time than the first period of time; and
   determining, based on the third trend, a second forecasted resource utilization by the computing device in the second time period.

4. The method of claim 2, wherein determining the first forecasted resource utilization comprises determining, in response to the first trend not having the threshold level of fit, the first forecasted resource utilization, wherein the first forecasted resource utilization is equal to the first actual resource utilization.

5. The method of claim 2, wherein determining the first forecasted resource utilization comprises determining, in response to the first trend having the threshold level of fit, the first forecasted resource utilization based on an extrapolation of the trend into the second time period and by adding the first pattern into the first forecasted resource utilization.

6. The method of claim 1 further comprising determining, based on whether a first comparison between the forecasted resource utilization and the second actual resource utilization indicates that the forecasted resource utilization and the second actual resource utilization satisfy a first similarity condition, whether to determine a new forecasted resource utilization by the computing device.

7. The method of claim 6, further comprising:
   receiving third data, at a predetermined frequency, that represents a third actual resource utilization by the computing device in a third time period after the second time period; and
   in response to the first comparison indicating that the forecasted resource utilization and the second actual resource utilization have satisfied the first similarity condition, determining, based on a second comparison between a second forecasted resource utilization and the third actual resource utilization, whether the forecasted resource utilization and the second actual resource utilization satisfy a second similarity condition.

8. The method of claim 7, wherein, in response to the second comparison indicating that the second forecasted resource utilization and the third actual resource utilization have not satisfied the second similarity condition, determining the new forecasted resource utilization by the computing device.

9. The method of claim 7, wherein, in response to the second comparison indicating that the second forecasted resource utilization and the third actual resource utilization have satisfied the second similarity condition, and in response to a threshold period of time elapsing, determining the new forecasted resource utilization by the computing device.

10. The method of claim 1 wherein the first pattern in the first data is a most dominant pattern in the first data, and wherein detecting the first trend in the first data based on the first pattern comprises:
    removing the most dominant pattern from the first data; and
    after the most dominant pattern is removed, detecting the first trend in the first data.

11. A system comprising:
    a processor;
    a non-transitory machine readable medium storing machine readable instructions to cause the processor to:
    receive first data representing a first actual resource utilization by a computing device during a first time period;
    detect a first pattern in the first data and a first trend in the first data based on the first pattern;
    determine whether the first trend has a threshold level of fit with the first data;
    determine, based on the first trend, a first forecasted resource utilization by the computing device in a second time period after the first time period;
    receive second data representing a second actual resource utilization by the computing device during the second time period;
    detect a second pattern in the second data; and
    determine, based on whether the second pattern is different from the first pattern, whether to determine a new forecasted resource utilization by the computing device.

12. The system of claim 11 wherein the machine readable instructions further include instructions to cause the processor to, in response to the first trend not having the threshold level of fit:
    detect a third pattern in the first data and third data and a third data trend in the first data and the third data based on the third pattern, wherein the third data represents a third actual resource utilization by the computing device in a different period of time than the first period of time; and
determine, based on the third trend, a second forecasted resource utilization by the computing device in the second time period.

13. The system of claim 11, wherein determining the first forecasted resource utilization, and wherein the machine readable instructions further include instructions to cause the processor to determine, in response to the first trend not having the threshold level of fit, the first forecasted resource utilization, wherein the first forecasted resource utilization is equal to the first actual resource utilization.

14. The system of claim 11, wherein determining the first forecasted resource utilization, and wherein the machine readable instructions further include instructions to cause the processor to determine, in response to the first trend having the threshold level of fit, the first forecasted resource utilization based on an extrapolation of the trend into the second time period and by adding the first pattern into the first forecasted resource utilization.

15. The system of claim 11 wherein the machine readable instructions further include instructions to cause the processor to determine, based on whether a first comparison between the forecasted resource utilization and the second actual resource utilization indicates that the forecasted resource utilization and the second actual resource utilization satisfy a first similarity condition, whether to determine a new forecasted resource utilization by the computing device.

16. The system of claim 15 wherein the machine readable instructions further include instructions to cause the processor to:
receive, at a predetermined frequency, a third data representing a third actual resource utilization by the computing device in a third time period after the second time period, and
in response to the first comparison indicating that the forecasted resource utilization and the second actual resource utilization have satisfied the first similarity condition, determine, based on a second comparison between a second forecasted resource utilization and the third actual resource utilization, whether the forecasted resource utilization and the second actual resource utilization satisfy a second similarity condition.

17. The system of claim 16 wherein the machine readable instructions further include instructions to cause the processor to, in response to the second comparison indicating that the second forecasted resource utilization and the third actual resource utilization have not satisfied the second similarity condition, determine the new forecasted resource utilization by the computing device.

18. The system of claim 16 wherein the machine readable instructions further include instructions to cause the processor to, in response to the second comparison indicating that the second forecasted resource utilization and the third actual resource utilization have satisfied the second similarity condition, and in response to a threshold period of time elapsing, determine the new forecasted resource utilization by the computing device.

19. The system of claim 11 wherein the first pattern in the first data is a most dominant pattern in the first data, and wherein the instructions to cause the processor to detect the first trend in the first data based on the first pattern comprise instructions to:
remove the most dominant pattern from the first data; and
after the most dominant pattern is removed, detect the first trend in the first data.

20. A non-transitory machine-readable medium storing machine-readable instructions executable by a processor that cause the processor to:
receive first data representing a first actual resource utilization by a computing device during a first time period;
detect a first pattern in the first data and a first trend in the first data based on the first pattern;
forecast, based on the first trend, a first forecasted resource utilization by the computing device in a second time period after the first time period;
receive second data representing a second actual resource utilization by the computing device during the second time period;
detect a second pattern in the second data; and
determine whether to forecast a new forecasted resource utilization by the computing device based on whether the first forecasted resource utilization and the second actual resource utilization satisfy a first similarity condition and based on whether the second pattern is different from the first pattern.

* * * * *